US011995301B2

(12) United States Patent
Hylak et al.

(10) Patent No.: US 11,995,301 B2
(45) Date of Patent: May 28, 2024

(54) METHOD OF DISPLAYING USER INTERFACES IN AN ENVIRONMENT AND CORRESPONDING ELECTRONIC DEVICE AND COMPUTER READABLE STORAGE MEDIUM

(71) Applicant: Apple Inc., Cupertino, CA (US)

(72) Inventors: Benjamin Hylak, Sunnyvale, CA (US); Alexis H. Palangie, Palo Alto, CA (US); Jordan A. Cazamias, Conroe, TX (US); Nathan Gitter, Cupertino, CA (US); Aaron M. Burns, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/182,304

(22) Filed: Mar. 10, 2023

(65) Prior Publication Data

US 2023/0315270 A1 Oct. 5, 2023

Related U.S. Application Data

(63) Continuation of application No. PCT/US2021/049130, filed on Sep. 3, 2021.

(60) Provisional application No. 63/077,104, filed on Sep. 11, 2020.

(51) Int. Cl.
*G06F 3/04845* (2022.01)
*G06F 3/01* (2006.01)
*G06F 3/0482* (2013.01)

(52) U.S. Cl.
CPC .......... *G06F 3/04845* (2013.01); *G06F 3/013* (2013.01); *G06F 3/0482* (2013.01)

(58) Field of Classification Search
CPC ..... G06F 3/04845; G06F 3/013; G06F 3/0482
USPC ........................................................ 715/764
See application file for complete search history.

(56) References Cited

U.S. PATENT DOCUMENTS

| 10,701,661 B1* | 6/2020 | Coelho ................. H04W 4/023 |
| 2015/0042679 A1 | 2/2015 | JÄrvenpÄÄ |
| 2016/0041391 A1* | 2/2016 | Van Curen ............ A63F 13/211 |
| | | 345/633 |
| 2017/0148339 A1* | 5/2017 | Van Curen ............ G06T 19/006 |
| 2019/0012060 A1 | 1/2019 | Moore et al. |
| 2019/0333278 A1* | 10/2019 | Palangie ............... G06T 19/003 |

(Continued)

FOREIGN PATENT DOCUMENTS

WO 2019/067902 A1 4/2019

OTHER PUBLICATIONS

International Search Report received for PCT Patent Application No. PCT/US2021/049130, mailed on Dec. 7, 2021, 4 pages.

*Primary Examiner* — William D Titcomb
(74) *Attorney, Agent, or Firm* — Kubota & Basol LLP

(57) ABSTRACT

Methods for displaying user interfaces in a computer-generated environment provide for an efficient and intuitive user experience. In some embodiments, user interfaces can have different immersion levels. In some embodiments, a user interface can have a respective immersion level based on its location in the three-dimensional environment or distance from the user. In some embodiments, a user interface can have a respective immersion level based on the state of the user interface. In some embodiments, a user interface can switch from one immersion level to another in response to the user's interaction with the user interface.

24 Claims, 13 Drawing Sheets

(56) References Cited

U.S. PATENT DOCUMENTS

| | | | | |
|---|---|---|---|---|
| 2020/0322178 A1* | 10/2020 | Wang | ............... | H04W 4/021 |
| 2020/0322575 A1* | 10/2020 | Valli | ............... | G03B 21/00 |
| 2020/0410960 A1* | 12/2020 | Saito | ............... | G06F 3/011 |
| 2021/0286502 A1* | 9/2021 | Lemay | ............... | G06F 3/017 |
| 2021/0312684 A1* | 10/2021 | Zimmermann | ............... | G02B 27/01 |
| 2021/0365108 A1* | 11/2021 | Burns | ............... | G06F 1/163 |
| 2022/0326837 A1* | 10/2022 | Dessero | ............... | G06F 3/011 |
| 2022/0350463 A1* | 11/2022 | Walkin | ............... | G06F 3/04883 |
| 2023/0273706 A1* | 8/2023 | Smith | ............... | G06F 3/04815 |
| | | | | 345/419 |
| 2023/0316658 A1* | 10/2023 | Smith | ............... | G06T 19/00 |
| | | | | 345/419 |

\* cited by examiner

METHOD OF DISPLAYING USER INTERFACES IN AN ENVIRONMENT AND CORRESPONDING ELECTRONIC DEVICE AND COMPUTER READABLE STORAGE MEDIUM

CROSS-REFERENCE TO RELATED APPLICATIONS

This application is a continuation of International Application No. PCT/US2021/049130, filed Sep. 3, 2021, which claims the benefit of U.S. Provisional Application No. 63/077,104, filed Sep. 11, 2020, the contents of which are incorporated herein by reference in their entireties for all purposes.

FIELD OF THE DISCLOSURE

This relates generally to methods for displaying user interfaces in a computer-generated environment.

BACKGROUND OF THE DISCLOSURE

Computer-generated environments are environments where at least some objects displayed for a user's viewing are generated using a computer. Users may interact with a computer-generated environment, such as by causing display of a user interface for an application.

SUMMARY OF THE DISCLOSURE

Some embodiments described in this disclosure are directed to methods of displaying user interfaces of an application in a computer-generated environment. Some embodiments described in this disclosure are directed to different immersion levels for user interfaces in a computer-generated environment. These interactions provide a more efficient and intuitive user experience. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
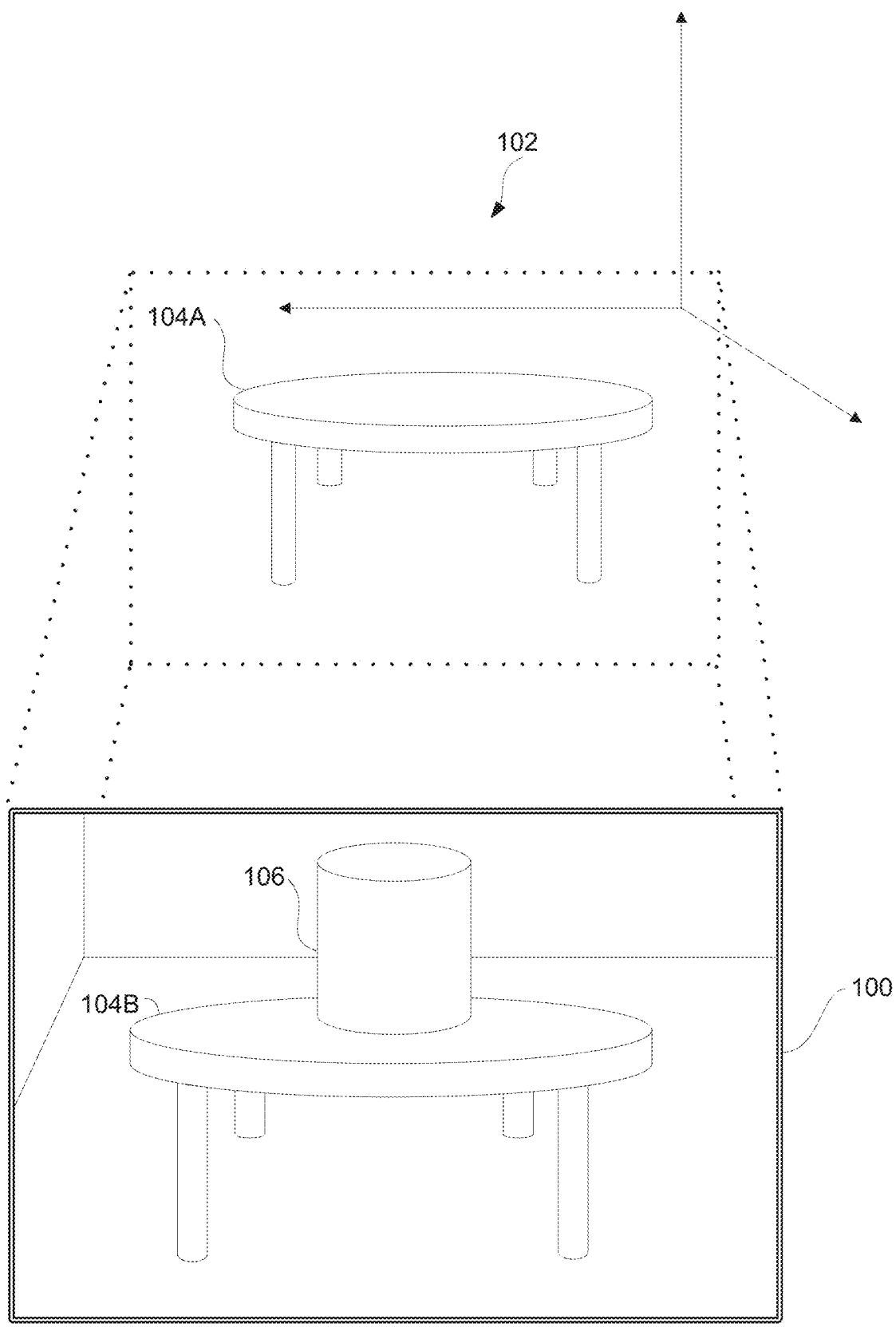
FIG. 1 illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. An XR environment is often referred to herein as a computer-generated environment. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic devices can enable a user to interact with and/or sense an XR environment. A non-exclusive list of examples include heads-up displays (HUDs), head mountable devices, projection-based devices, windows or vehicle windshields having integrated display capability, displays formed as lenses to be placed on users' eyes (e.g., contact lenses), headphones/earphones, input devices with or without haptic feedback (e.g., wearable or handheld controllers), speaker arrays, smartphones, tablets, and desktop/laptop computers. A head mountable device can have one or more speaker(s) and an opaque display. Other head mountable devices can be configured to accept an opaque external display (e.g., a smartphone). The head mountable device can include one or more image sensors to capture images/video of the physical environment and/or one or more microphones to capture audio of the physical environment. A head mountable device may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based devices can utilize retinal projection technology that projects images onto users' retinas. Projection devices can also project virtual objects into the physical environment (e.g., as a hologram or onto a physical surface).

FIG. 1 illustrates an electronic device 100 configurable to display a computer-generated environment according to some embodiments of the disclosure. In some embodiments, electronic device 100 is a portable electronic device, such as a tablet computer, laptop computer or a smartphone, among other possibilities. Example architectures of electronic device 100 are described in further detail with reference to FIGS. 2A-2B. FIG. 1 illustrates electronic device 100 and table 104A located in the physical environment 102. In some embodiments, electronic device 100 is configured to capture and/or display areas of physical environment 102 including table 104A (illustrated in the field of view of electronic device 100). In some embodiments, the electronic device 100 is configured to display one or more virtual objects in the computer-generated environment that are not present in the physical environment 102, but are displayed in the computer generated environment (e.g., positioned on or otherwise anchored to the top surface of a computer-generated representation 104B of real-world table 104A). In FIG. 1, for example, an object 106 not present in the physical environment (e.g., a virtual object) is displayed on the surface of the table 104B in the computer-generated environment displayed via device 100, optionally in response to detecting the planar surface of table 104A in the physical environment 102. It should be understood that object 106 is a representative object and one or more different objects (e.g., of various dimensionality such as two-dimensional or three-dimensional objects) can be included and rendered in a two-dimensional or a three-dimensional computer-generated environment. For example, the virtual objects can include an application or a user interface displayed in the computer-generated environment. Additionally, it should be understood, that the three-dimensional (3D) environment (or 3D object) described herein may be a representation of a 3D environment (or 3D object) displayed in a two dimensional (2D) context (e.g., displayed on a 2D display screen).

Figure 2A:
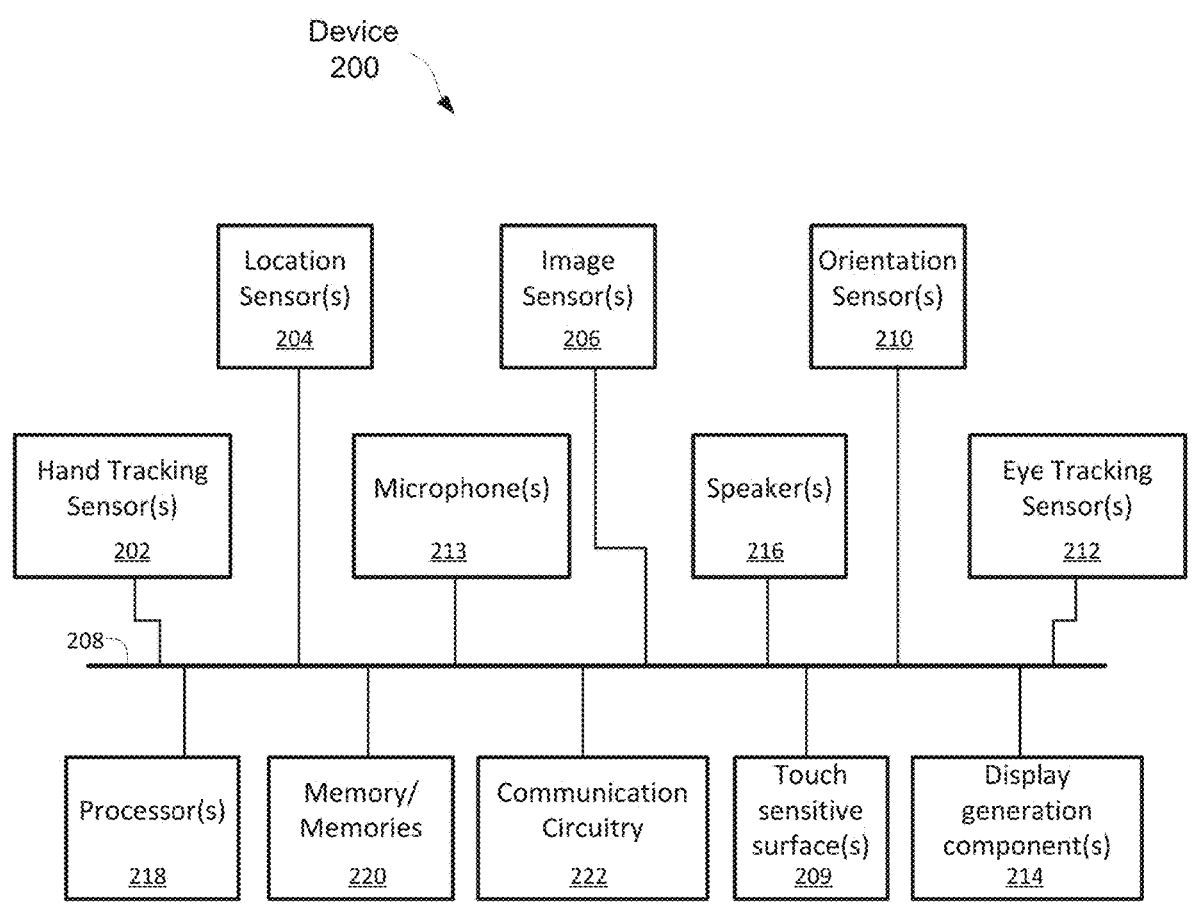
FIGS. 2A-2B illustrate block diagrams of exemplary architectures for a device or devices in accordance with some embodiments of the disclosure.
Figure 2B:
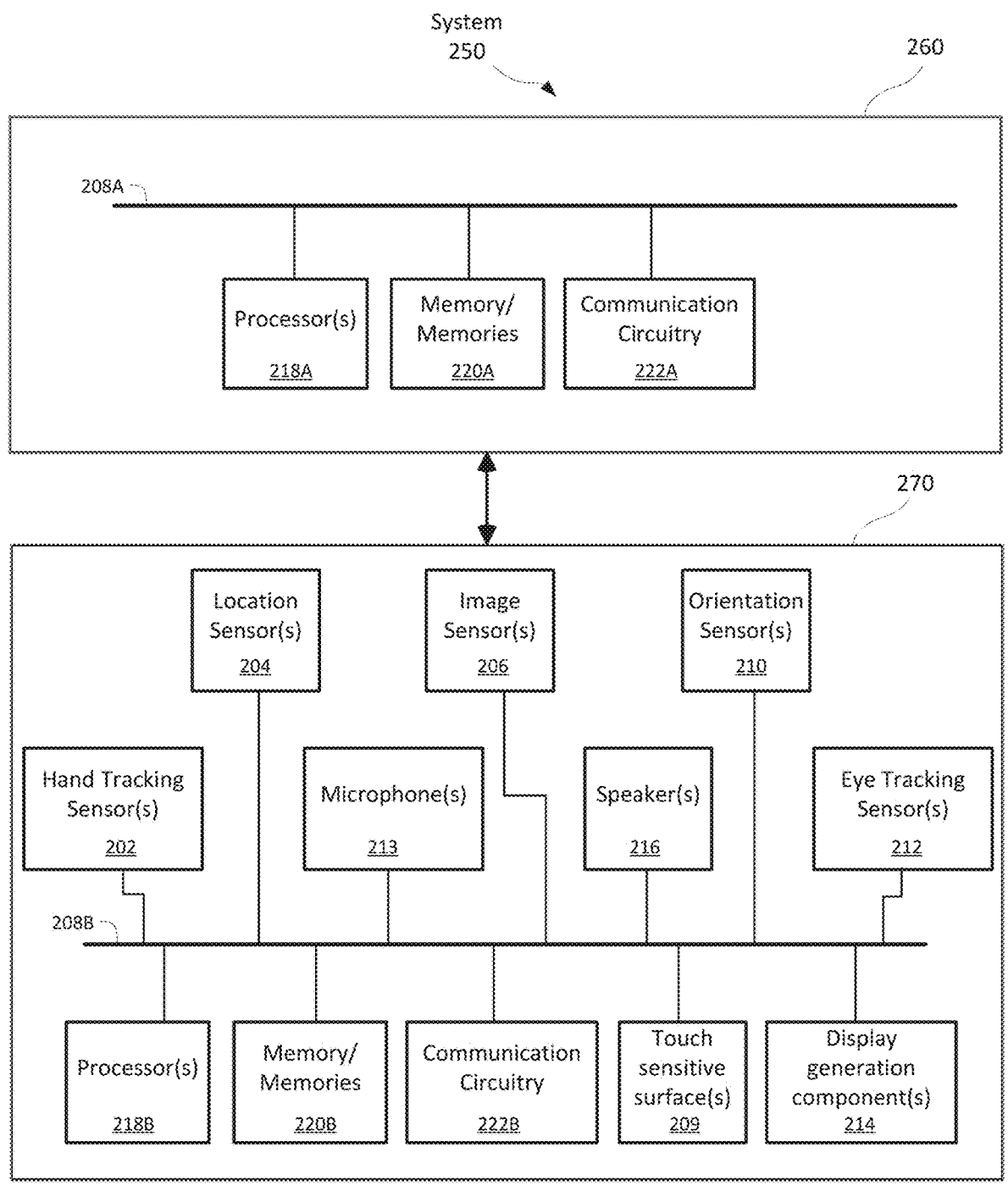

FIGS. 2A-2B illustrate example block diagrams of architectures for a device or devices in accordance with some embodiments of the disclosure. The blocks in FIG. 2A can represent an information processing apparatus for use in a device. In some embodiments, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some embodiments, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some embodiments, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some embodiments, display generation component(s) 214 include multiple displays. In some embodiments, display generation component(s) 214 includes a display with a touch-sensitive surface (e.g., a touch screen), a projector, a holographic projector, a retinal projector, etc.

In some embodiments, device 200 includes touch-sensitive surface(s) 209 configured to receive user inputs (touch and/or proximity inputs), such as tap inputs and swipe inputs or other gestures. In some embodiments, display generation component(s) 214 and touch-sensitive surface(s) 209 together form touch-sensitive display(s) (e.g., a touch screen integrated with device 200 or external to device 200 that is in communication with device 200). It should be understood, that device 200 optionally includes or receives input from one or more other physical user-interface devices than a touch-sensitive surface, such as a physical keyboard, a mouse, a stylus and/or a joystick (or any other suitable input device).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment.

Image sensor(s) 206 optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 206 include a first image sensor and a second image sensor. The first image sensor and the second image sensor work together and are optionally configured to capture different information of physical objects in the real-world environment. In some embodiments, the first image sensor is a visible light image sensor and the second image sensor is a depth sensor. In some embodiments, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some embodiments, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. The user's gaze can include a direction in which the eyes are directed, and optionally intersection with a particular point or region of space and/or intersection with a particular object. In some embodiments, hand tracking sensor(s) 202 and/or eye tracking sensor(s) 212 are implemented together with the display generation component(s) 214 (e.g., in the same device). In some embodiments, the hand tracking sensor(s) 202 and/or eye tracking sensor(s) 212 are implemented separate from the display generation component(s) 214 (e.g., in a different device).

In some embodiments, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some embodiments, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some embodiments, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some embodiments, both eyes are tracked separately by respective eye tracking cameras and illumination sources, and gaze can be determined from tracking both eyes. In some embodiments, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some embodiments, microphone(s) 213 includes an array of microphones that optionally operate together (e.g., to identify ambient noise or to locate the source of sound in space of the real-world environment). In some embodiments, audio and/or voice inputs can be used to interact with the user interface or computer-generated environment captured using one or more audio sensors (e.g., microphones), as permitted by the user of the electronic device.

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that device 200 is not limited to the components and configuration of FIG. 2A. For example, the device can include fewer, additional, or other components in the same or different configurations. In some embodiments, as illustrated in FIG. 2B, system 250 can be divided between multiple devices. For example, a first device 260 optionally includes processor(s) 218A, memory or memories 220A, and communication circuitry 222A, optionally communicating over communication bus(es) 208A. A second device 270 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

Device 200 or system 250 typically support a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo/video management application, a digital camera application, a digital video camera application, a web browsing application, a digital music player application, a television channel browsing application, and/or a digital video player application.

A computer-generated environment may be displayed using an electronic device (e.g., electronic device 100, device 200, device 270), including using one or more display generation components. The computer-generated environment can optionally include various graphical user interfaces ("GUIs") and/or user interface objects.

In some embodiments, the electronic device can detect or estimate a lighting characteristic of the real world. The estimate of the lighting characteristic can provide some understanding of lighting in the environment. For example, the estimate of the lighting characteristic may provide an indication of which regions of the real-world environment are light or dark. The estimate of the lighting characteristic may provide an indication of the position of light sources (e.g., parametric light sources, directional light sources, point light sources, area light sources, etc.) and/or orientation of light sources. In some embodiments, the lighting characteristic is estimated as a per-voxel incident light field indicating brightness, color and/or direction. For example, the lighting characteristic can be parameterized as an image-based lighting (IBL) environment map. It should be understood that other parameterizations of the lighting characteristic are possible. In some examples, the lighting characteristic is estimated on a per pixel basis of using a triangle mesh with the lighting characteristic defining lighting for each vertex or for each face. Additionally, it should be understood that the estimate of the lighting characteristic is optionally derived from an intermediate representation (e.g., environment map).

In some embodiments, sensors such as cameras (e.g., image sensor(s) 206) are used to capture images of the real-world environment. The images can be processed by processing circuitry (one or more of processor(s) 218) to localize and measure light sources. In some embodiments, light can be determined from the reflections and or shadows cast by light sources in the environment. In some embodiments, deep learning (e.g., supervised) or other artificial intelligence or machine learning is used to estimate the lighting characteristic based on input image(s).

As described herein, a computer-generated environment including various graphics user interfaces ("GUIs") may be displayed using an electronic device, such as electronic device 100 or device 200, including one or more display generation components. The computer-generated environment can include one or more GUIs associated with an application. In some embodiments, the one or more user interfaces associated with an application can have different immersion levels. In some embodiments, the immersion level of a user interface can depend on its intractability and/or its position, location, and/or distance from the user.

Figure 3A:
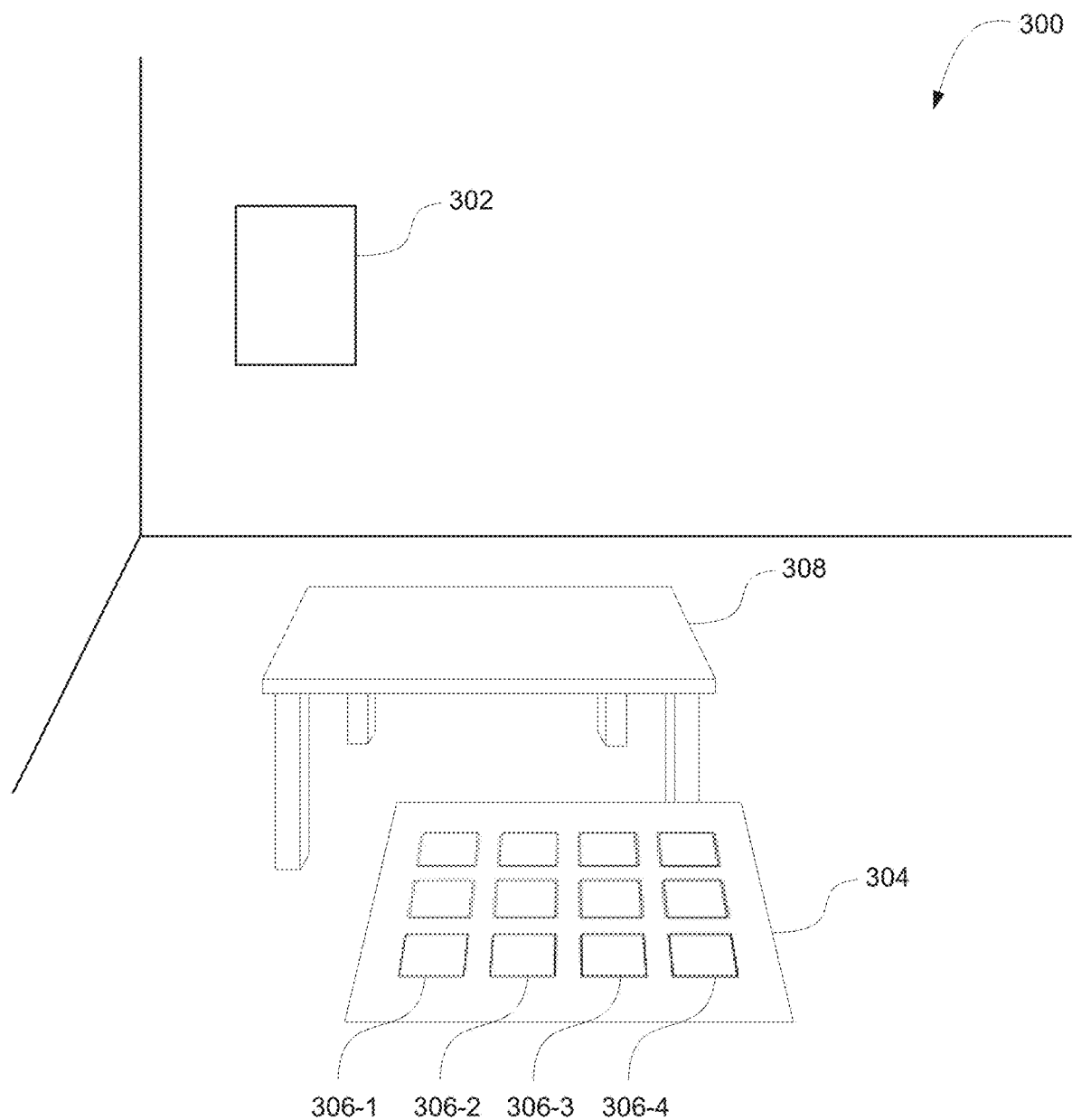
FIGS. 3A-3C illustrate a method of displaying a user interface of an application in a three-dimensional environment according to some embodiments of the disclosure.
Figure 3B:
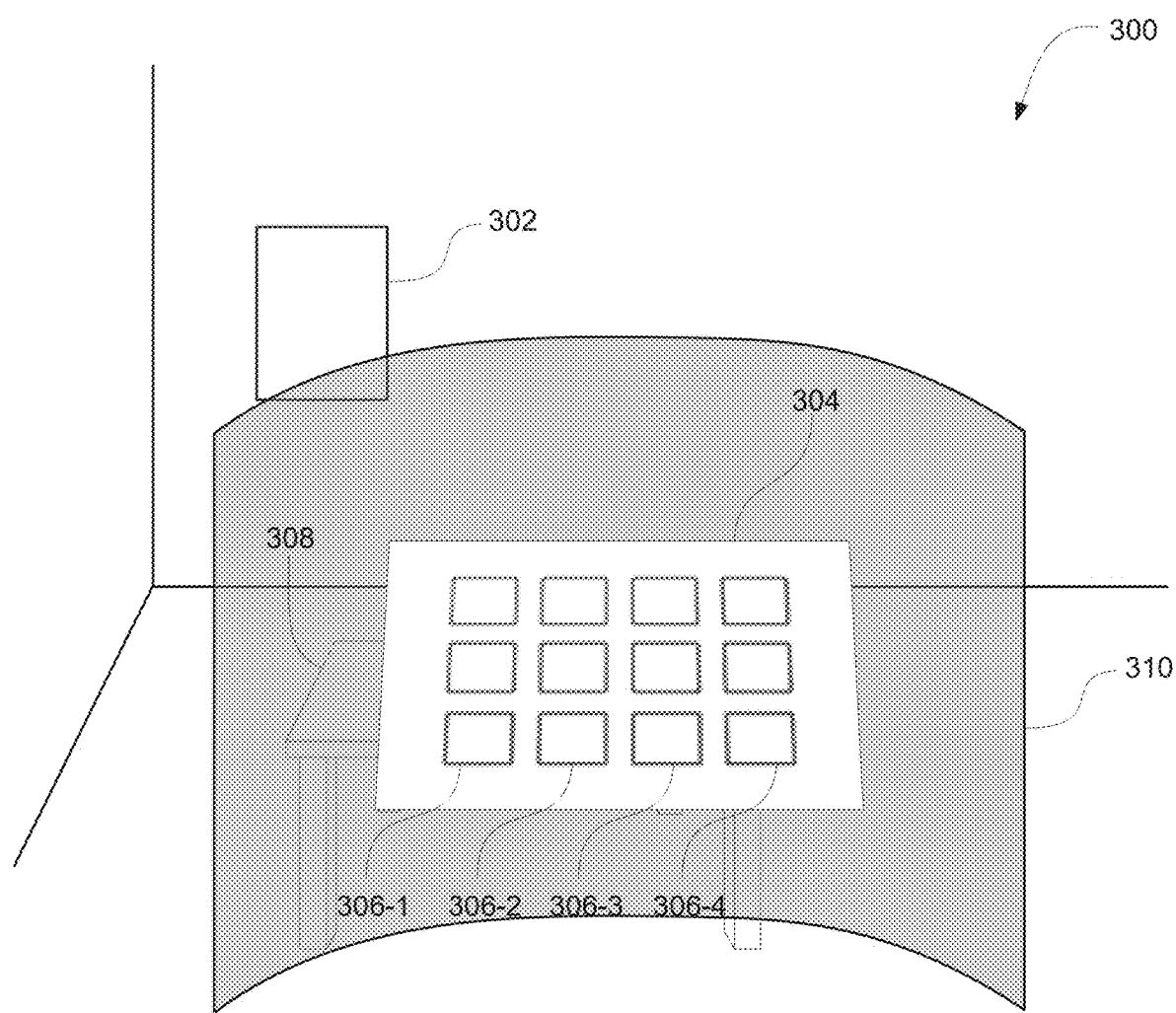
Figure 3C:
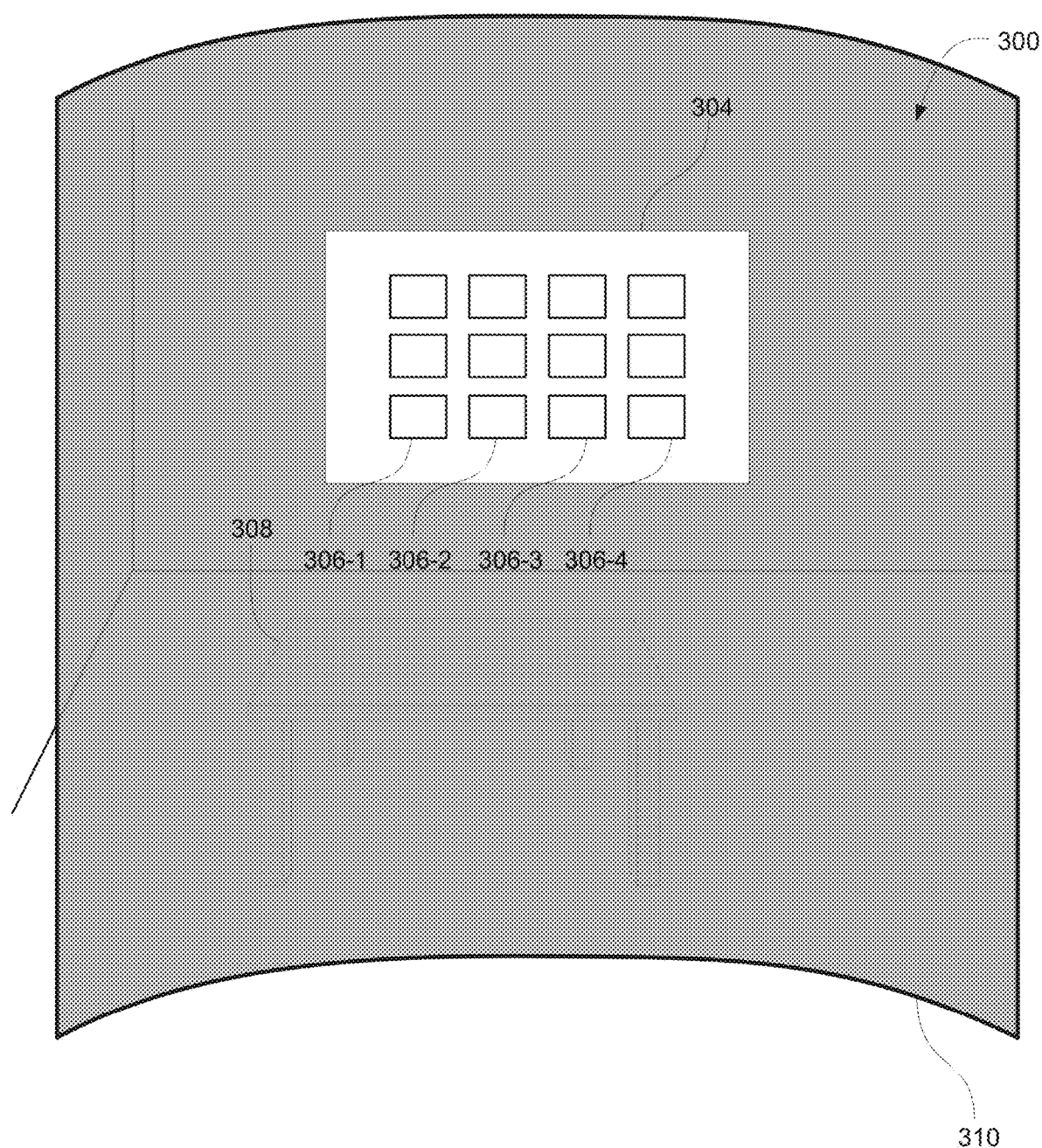

FIGS. 3A-3C illustrate a method of displaying a user interface 304 of an application in a three-dimensional environment 300. In FIG. 3A, an electronic device (e.g., such as devices 100 or 200 described above) is displaying a three-dimensional environment 300. In some embodiments, three-dimensional environment 300 includes one or more real-world objects (e.g., representations of objects in the physical environment around the device) and/or one or more virtual objects (e.g., representations of objects generated and displayed by the device that are not necessarily based on real world objects in the physical environment around the device). For example, in FIG. 3A, table 308 and picture frame 302 can both be representations of real world objects in the physical environment around the device. In some embodiments, table 308 and picture frame 302 are displayed by the display generation component by capturing one or more images of table 308 and picture frame 302 and displaying a representation of the table and picture frame (e.g., a photorealistic representation, a simplified representation, a caricature, etc.), respectively, in three-dimensional environment 300. In some embodiments, table 308 and picture frame 302 are passively provided by the device via a transparent or translucent display by not obscuring the user's view of table 308 and picture frame 302. In FIG. 3A, user interface 304 is a virtual object and is displayed in three-dimensional environment 300 and does not exist in the physical environment around the device.

In FIG. 3A, user interface 304 is a user interface of a respective application, including one or more selectable options 306 (e.g., selectable options 306-1 to 306-4 including the other selectable options that are not labeled for simplicity). It is understood that user interface 304 can be any type of user interface of any application and is not limited to the embodiment illustrated herein. As shown in FIG. 3A, user interface 304 is displayed at a first distance from the user (e.g., in the "z" dimension) and at a first location in three-dimensional environment 300 and has a first immersion level (e.g., no immersion). In some embodiments, while user interface 304 is at a first location in three-dimensional environment 300 and/or at a first distance from the user, user interface 304 has the first immersion level in which other objects and/or portions of three-dimensional environment 300 are not modified to visually distinguish user interface 304 from the other objects and/or portions of three-dimensional environment 300. For example, table 308, picture frame 302, and/or other portions of three-dimensional environment 300 are not modified from their "default" look and feel.

In some embodiments, a level of immersion (e.g., immersion level) indicates a state and the amount in which an object (e.g., user interface objects, user interfaces, menus, applications, selectable options, shapes, virtual objects, etc.) in an environment (e.g., a three-dimensional environment, a computer-generated environment, etc.) is visually emphasized with respect to other objects in the environment, for the purpose of increasing the user's sense of immersion with the visually emphasized object. In some embodiments, a level of immersion (e.g., immersion level) includes an associated degree to which the electronic device displays background content (e.g., content other than the respective user interface) around/behind the first respective user interface, optionally including the number of items of background content displayed and the visual characteristics (e.g., colors, contrast, opacity) with which the background content is displayed. In some embodiments, the background content is included in a background over which the first respective user interface is displayed. In some embodiments, the background content includes additional user interfaces (e.g., user interfaces generated by the device corresponding to applications other than the application of the respective user interface, system user interfaces), virtual objects (e.g., files, representations of other users, etc. generated by the device) not associated with or included in the respective user interface, and real objects (e.g., pass-through objects representing real objects in the physical environment of the electronic device that are displayed by the device such that they are visible via the display generation component). In some embodiments, at a first (e.g., low) level of immersion, the background, virtual and/or real objects are displayed in an unobscured manner. For example, a respective user interface with a low level of immersion is displayed concurrently with the background content, which is displayed with full brightness, color, and/or translucency. In some embodiments, at a second (e.g., higher) level of immersion, the background, virtual and/or real objects are displayed in an obscured manner (e.g., dimmed, blurred, removed from display, etc.). For example, a respective user interface with a high level of immersion is displayed without concurrently displaying the background content (e.g., in a full screen or fully immersive mode). As another example, a user interface displayed with a medium level of immersion is displayed concurrently with darkened, blurred, or otherwise de-emphasized background content. In some embodiments, the visual characteristics of the background objects varies among the background objects. For example, at a particular immersion level, one or more first background objects are visually de-emphasized (e.g., dimmed, blurred, displayed with increased transparency) more than one or more second background objects and one or more third background objects cease to be displayed.

In some embodiments, while user interface 304 is at a first location and/or at a first distance from the user, user interface 304 has a first pitch value (e.g., a particular orientation or spatial relationship) with respect to the user. For example, in FIG. 3A, user interface 304 is angled such that it is facing upwards and towards the head of the user (e.g., user interface 304 is displayed lower than eye level of the user). Thus, as the user looks down at user interface 304, user interface 304 will appear as if user interface 304 were facing upwards towards the eyes of the user (e.g., pitched upwards at a certain angle).

FIG. 3B illustrates user interface 304 while user interface 304 is at a second location in three-dimensional environment 300 and/or at a second distance from the user. In FIG. 3B, because user interface 304 is at a second distance from the user, user interface 304 is displayed higher such that it is at or just below the eye level of the user. Thus, user interface 304 is displayed with a second pitch value with respect to the user. In some embodiments, the pitch value of user interface 304 is shallower than the pitch value of user interface 304 in FIG. 3A (e.g., pitched upwards at a smaller angle). In some embodiments, because user interface 304 is at or just below the eye level of the user (and is higher than user interface 304 in FIG. 3A), user interface 304 can be displayed with a shallower angle such that when the user looks at or down at user interface 304, user interface 304 need not be angled as much as in FIG. 3A to be facing the eye of the user.

In FIG. 3B, user interface 304 has a second immersive level, that is a higher immersive level than in FIG. 3A. As shown in FIG. 3B, the device displays an immersion field 310. In some embodiments, immersion field 310 is the area around user interface 304 that causes objects that fall within the visual boundary of immersion field 310 (e.g., the effective boundary of immersion field 310) to be visually modified to increase the immersive effect of user interface 304. In some embodiments, as shown in FIG. 3B, immersion field 310 is three-dimensional and "wraps" around a central reference point. In some embodiments, the central reference point is the location of the user and/or device such that it appears as if immersion field 310 is the same distance from the user and/or device (e.g., at all points of immersion field 310, such that if the user were to look left and/or right, the immersion field is still the same distance from the user). In some embodiments, the effective boundary of immersion field 310 includes the portions of three-dimensional environment 300 that appear, from the perspective of the user and/or device, inside of the boundary of immersion field 310. For example, due to the perspective effect, objects in front of or behind immersion field 310 can fall within the effective boundary of immersion field 310 if, the objects are farther from immersion field 310, but are located directly behind immersion field 310 such that they would otherwise be partially obscured by immersion field 310 (e.g., if immersion field 310 were a solid object), or if the objects are closer than immersion field 310, but are located directly in front of immersion field 310 such that they would otherwise partially obscure immersion field (e.g., if the objects were solid objects).

In some embodiments, immersion field 310 is 10% larger, 30% larger, 50% larger, 100% larger, etc. (e.g., wider, taller, or both) than user interface 304. In some embodiments, immersion field 310 encompasses a display area (e.g., the effective boundary of immersion field 310) that is larger than the display area encompassed by user interface 304 (e.g., 10% larger, 30% larger, 50% larger, 100% larger, etc.). In some embodiments, immersion field 310 is a virtual object that is displayed at the same z-depth as user interface 304 (e.g., immersion field 310 is a container object that includes user interface 304 and is displayed at the same distance from the user as user interface 304) or at a z-depth farther than user interface 304 (e.g., 1 inch behind user interface 304, 6 inches behind, 1 foot behind, 3 feet behind, etc.). In some embodiments, immersion field 310 is an overlay and is displayed in front of user interface 304 (e.g., at a shallower z-depth than user interface 304) and is overlaid on every object in three-dimensional environment 300 (e.g., immersion field 310 is not a virtual object, but rather a visual filter on a portion of the three-dimensional environment such that every object that falls within the display area and/or effective boundary of immersion field 310, regardless of their respective z-depths, is visually modified, as will be described in more detail below).

In some embodiments, objects within immersion field 310 (e.g., objects in three-dimensional environment 300 that are in front of, at the same depth as, and/or farther than immersion field 310 that the objects fall within the effective boundary of immersion field 310, or objects that are overlaid by immersion field 310) are dimmed, shaded, blurred, partially obscured, or otherwise visually de-emphasized as compared to user interface 304. For example, objects that are located farther than immersion field 310 and are located in three-dimensional environment 300 at a location such that they appear (e.g., from the perspective of the user) directly behind immersion field 310 (e.g., the objects appear to be within a bounding box defined by the boundary of immersion field 310) are visually modified. In some embodiments, objects that are located closer than immersion field 310, but are located in three-dimensional environment 300 at a location such that they appear (e.g., from the perspective of the user) directly in front of immersion field 310 (e.g., the objects appear to be within a bounding box defined by the boundary of immersion field 310) are visually modified. As shown in FIG. 3B, user interface 304 is visually unmodified and as a result, is visually emphasized as compared to other objects within immersion field 310, such as table 308 and the part of picture frame 302 within immersion field 310. Thus, table 308 can be darkened, blurred, and/or completely removed from display. In some embodiments, immersion field 310 is three-dimensional and is curved around the position of the user. In some embodiments, while in the second immersive level, immersion field 310 encompasses a portion of three-dimensional environment 300 and does not encompass the entirety of three-dimensional environment 300.

FIG. 3C illustrates user interface 304 while user interface 304 is at a third location in three-dimensional environment 300 (e.g., placed on the back wall) and/or at a third distance from the user. In FIG. 3C, because user interface 304 is at a third distance from the user, user interface 304 is displayed higher such that it is above the eye level of the user. Thus, user interface 304 is displayed with a third pitch value with respect to the user. In some embodiments, the pitch value of user interface 304 is shallower than the pitch value of user interface 304 in FIGS. 3A and 3B. In some embodiments, because user interface 304 is just above the eye level of the user (and is higher than user interface 304 in FIGS. 3A and 3B), user interface 304 can be displayed with a shallower angle and/or no angle such that when the user looks at user interface 304, user interface 304 need not be angled to appear to be facing the eye of the user.

In FIG. 3C, user interface 304 has a third immersive level, that is a higher immersive level than in FIG. 3A and FIG. 3B. As shown in FIG. 3C, the device displays an immersion field 310. In some embodiments, immersion field 310 in FIG. 3C is larger than immersion field 310 in FIG. 3B. For example, immersion field 310 in FIG. 3C is 20% larger, 50% larger, 100% larger, 300% larger, etc. (e.g., wider, taller, or both) than user interface 304. In some embodiments, immersion field 310 encompasses a display area (e.g., of the display generation component that is displaying three-dimensional environment 300) that is larger than the display area encompassed by user interface 304 (e.g., 20% larger, 50% larger, 100% larger, 300% larger, etc.). In some embodiments, immersion field 310 encompasses all or substantially all of three-dimensional environment 300 (e.g., encompasses all or substantially all of the display area of the display generation component that is displaying three-dimensional environment 300). In some embodiments, immersion field 310 is a virtual object that is displayed at the same z-depth as user interface 304 (e.g., immersion field 310 is a container object that includes user interface 304 and is displayed at the same distance from the user as user interface 304) or at a z-depth farther than user interface 304 (e.g., 1 inch behind user interface 304, 6 inches behind, 1 foot behind, 3 feet behind, etc.). In some embodiments, immersion field 310 is an overlay and is displayed in front of user interface 304 (e.g., at a shallower z-depth than user interface 304) and is overlaid on every object in three-dimensional environment 300 (e.g., immersion field 310 is a visual filter such that every object that falls within the display area of immersion field 310, regardless of their respective z-depths, is visually modified, as will be described in more detail below). For example, although table 308 is at a shallower z-depth than user interface 304, which is causing immersion field 310 to be displayed, table 308 is visually modified due to falling within immersion field 310.

In some embodiments, the effects of immersion field 310 in FIG. 3C are stronger than the effects of immersion field 310 in FIG. 3B. For example, immersion field 310 in FIG. 3C causes more dimming, more blurring, and/or more shading than immersion field 310 in FIG. 3B. In some embodiments, immersion field 310 can cause certain objects to no longer be displayed. For example, in FIG. 3C, table 308 is displayed dimmer than in FIG. 3B, but picture frame 302 has been removed from display (e.g., fully obscured by immersion field 310). In some embodiments, picture frame 302 has been removed from display because it is on the same surface and/or is at the same distance as user interface 304 and can negatively affect the immersion of user interface 304.

In some embodiments, while in the third immersive level, immersion field 310 encompasses a large portion or all of three-dimensional environment 300 (e.g., more than immersion field 310 in FIG. 3B). In some embodiments, when immersion field 310 encompasses all of three-dimensional environment 300, optionally all of three-dimensional environment 300 outside of user interface 304 (e.g., all objects in three-dimensional environment 300 other than user interface 304) is obscured (e.g., partially or completely), darkened, blacked out, and/or blurred. In some embodiments, the only viewable element in three-dimensional environment 300 is user interface 304.

It is understood that user interface 304 can change size while at different immersion levels and/or positions in three-dimensional environment 300. For example, while user interface 304 is at the first location in three-dimensional environment 300 (e.g., as in FIG. 3A), user interface 304 has a first size, but when user interface 304 is at the second location in three-dimensional environment 300 (e.g., as in FIG. 3B), user interface 304 has a second, larger size. In some embodiments, user interface 304 increases in size by the same proportionate amount as the change in the distance from the user (e.g., in the z dimension) and thus the size of user interface 304 appears to not change (e.g., from the user's perspective). For example, the amount of the display area (e.g., viewable area) remains constant. In some embodiments, user interface 304 increases in size by more than a proportionate amount as the change in the distance from the user, and thus the size of user interface 304 appears to increase (e.g., encompasses more of the display area) as user interface 304 mores from the first location to the second location.

It is also understood that although the examples provided herein illustrate three levels of immersion, this is merely exemplary and any number of immersion levels can be implemented. Similarly, different objects in three-dimensional environment 300 can be affected by immersion levels differently. For example, certain objects can be darkened earlier and/or faster than other objects (e.g., darkened at a lower immersion level than other objects and/or ceased to be displayed at a lower immersion level than other objects).

In some embodiments, when a user interface of an application has an immersion level that is greater than the lowest immersion level (e.g., no immersion, such as in FIG. 3A), then no other applications can have user interfaces with an elevated immersion level. For example, two applications cannot simultaneously cause the environment around their respective user interfaces to be modified. In some embodiments, multiple applications can simultaneously maintain an elevated immersion level (for example, if the respective immersion fields do not conflict). For example, if a user interface of a first application is displayed on the left side of a three-dimensional environment and a user interface of a second application is displayed on the right side of a three-dimensional environment, then if both user interfaces are at a medium immersion level (e.g., such as in FIG. 3B)

with respective immersion fields that do not overlap, then both user interfaces can be permitted to have elevated immersion levels. In some embodiments, user interfaces for multiple applications can have elevated immersion levels, but only the immersion level of the application that has the current focus (e.g., the application that the user is currently interacting with) is active (e.g., the immersion levels of other applications are disabled or inactive until or unless the other applications receive focus).

Figure 4A:
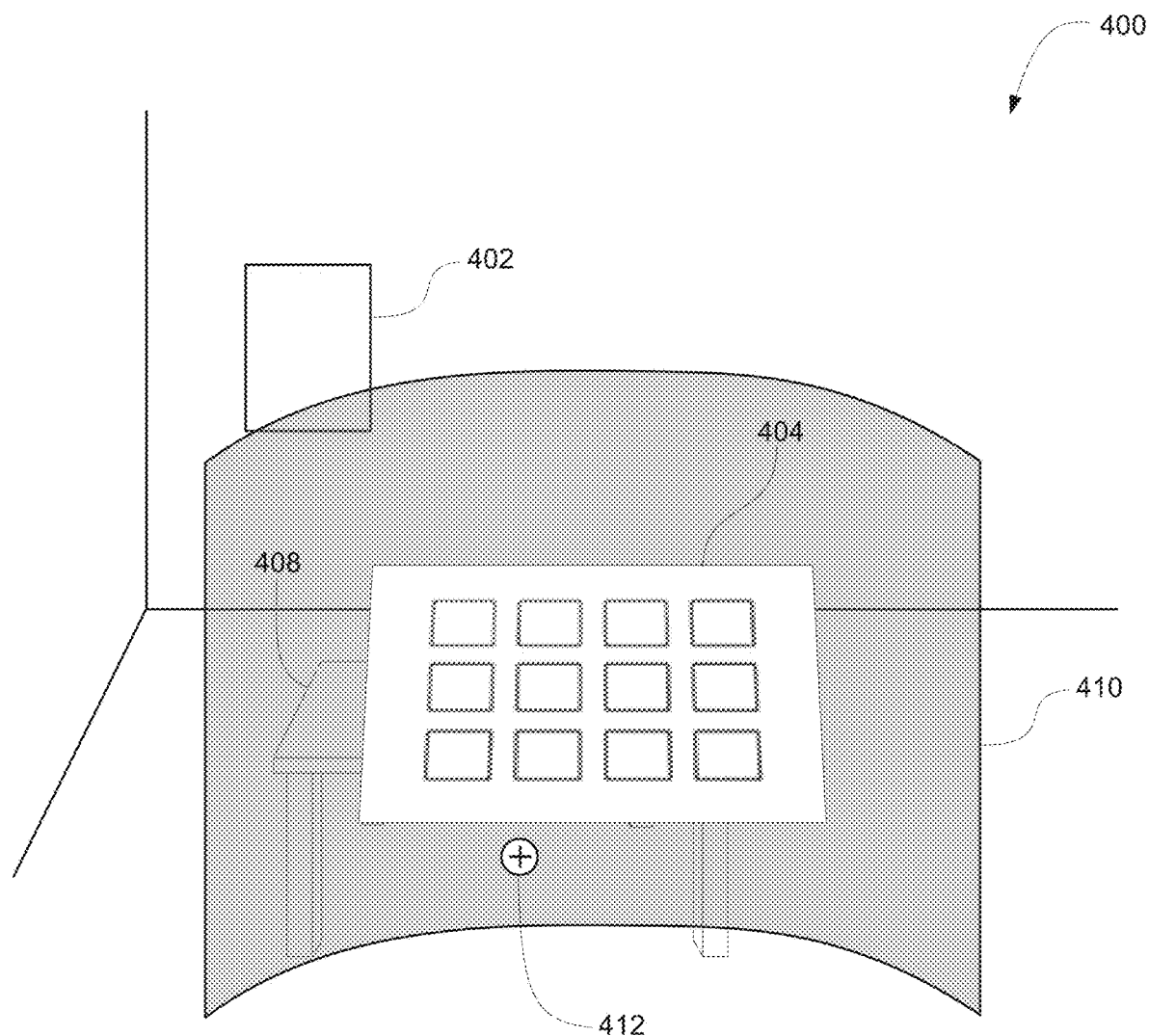
FIGS. 4A-4B illustrate a method of displaying objects on a user interface of an application according to some embodiments of the disclosure.
Figure 4B:
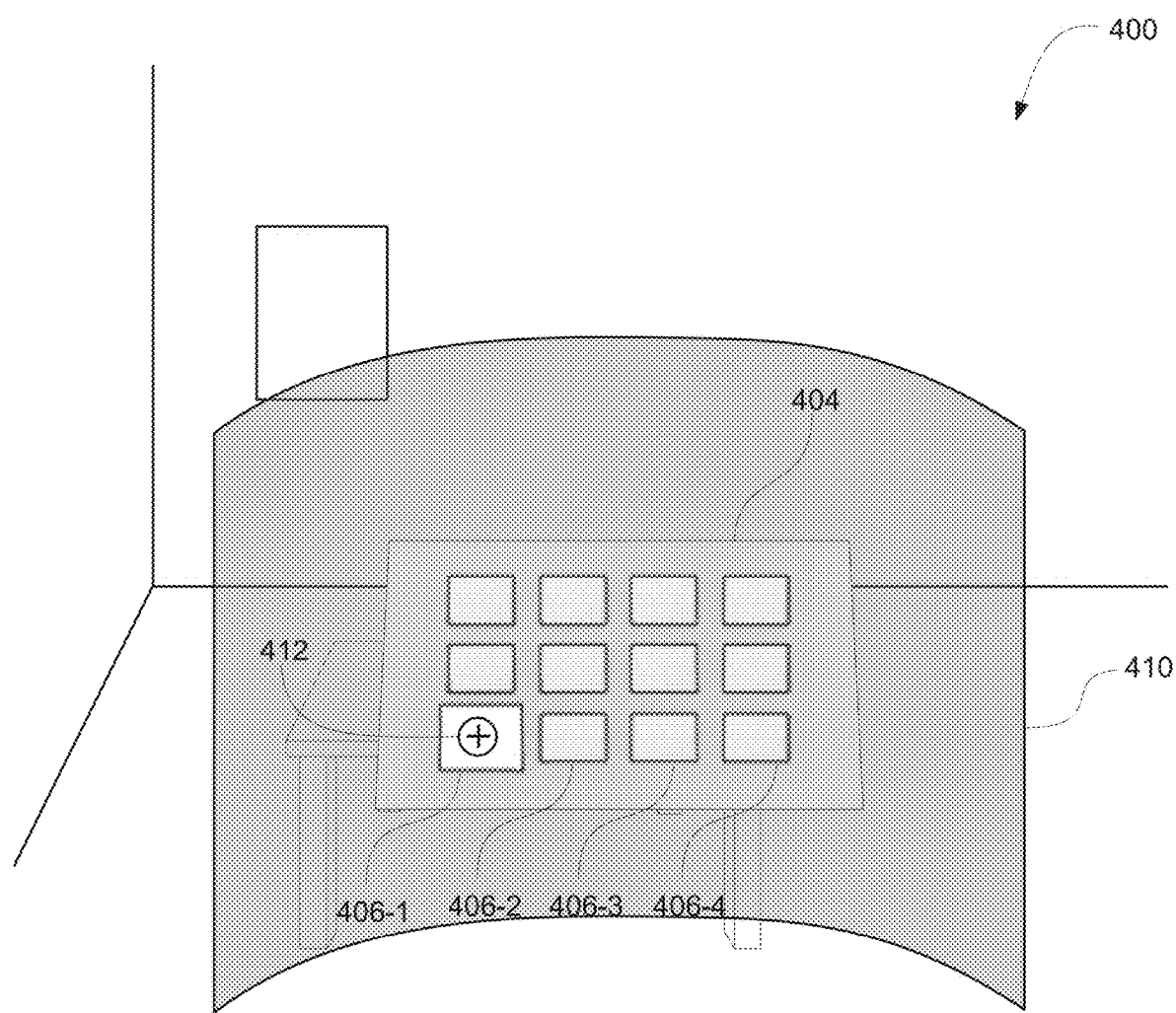

FIGS. 4A-4B illustrate a method of displaying objects on a user interface of an application according to some embodiments of the disclosure. In FIG. 4A, the electronic device is displaying three-dimensional environment 400 including user interface 404 while in the second immersion level (e.g., such as in FIG. 3B). As shown in FIG. 4A, the gaze 412 of the user is directed to a location other than user interface 404 (e.g., the user is looking at a location in three-dimensional environment 400 other than user interface 404). In some embodiments, in accordance with a determination that the gaze is not directed to user interface 404 or an element of user interface 404, user interface 404 is displayed without visually emphasizing or de-emphasizing any element in user interface 404. Thus, user interface 404 can be displayed without modifying the visual characteristic of the elements of user interface 404.

In FIG. 4B, the gaze 412 of the user has changed to be directed to selectable option 406-1. In some embodiments, in response to detecting that the gaze 412 of the user is directed to selectable option 406-1, selectable option 406-1 is visually emphasized as compared to the other elements of user interface 404 (e.g., the other selectable options, other user interface elements, the background of user interface 404, etc.). For example, selectable option 406-1 can be highlighted, enlarged, and/or brightened, or the other user interface elements can be dimmed and/or reduced in size. In FIG. 4B, selectable option 406-1 is increased in size while the other selectable options (e.g., selectable options 406-2 to 406-4, the other user interface elements, and/or the background) are darkened, blurred, or otherwise visually de-emphasized. Thus, in some embodiments, when the gaze 412 of the user is directed to (e.g., focused on, looking at) a particular user interface element, the device can implement a local immersion level (e.g., within a user interface, amongst the elements of a user interface, etc.) by visually emphasizing the element to which the gaze is directed and/or visually de-emphasizing the elements to which the gaze is not directed.

Figure 5A:
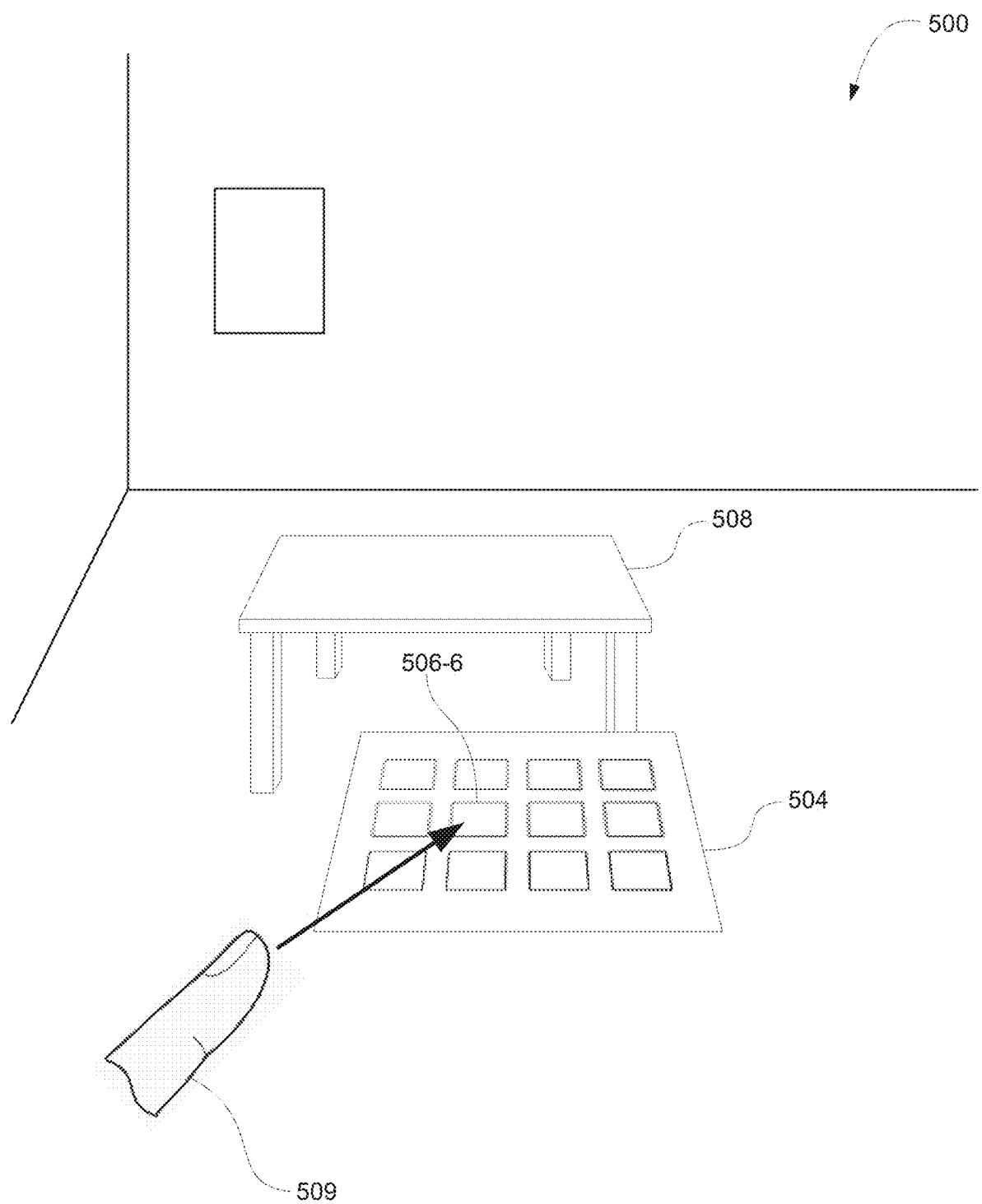
FIGS. 5A-5B illustrate a method of switching from one immersion level to another immersion level according to some embodiments of the disclosure.
Figure 5B:
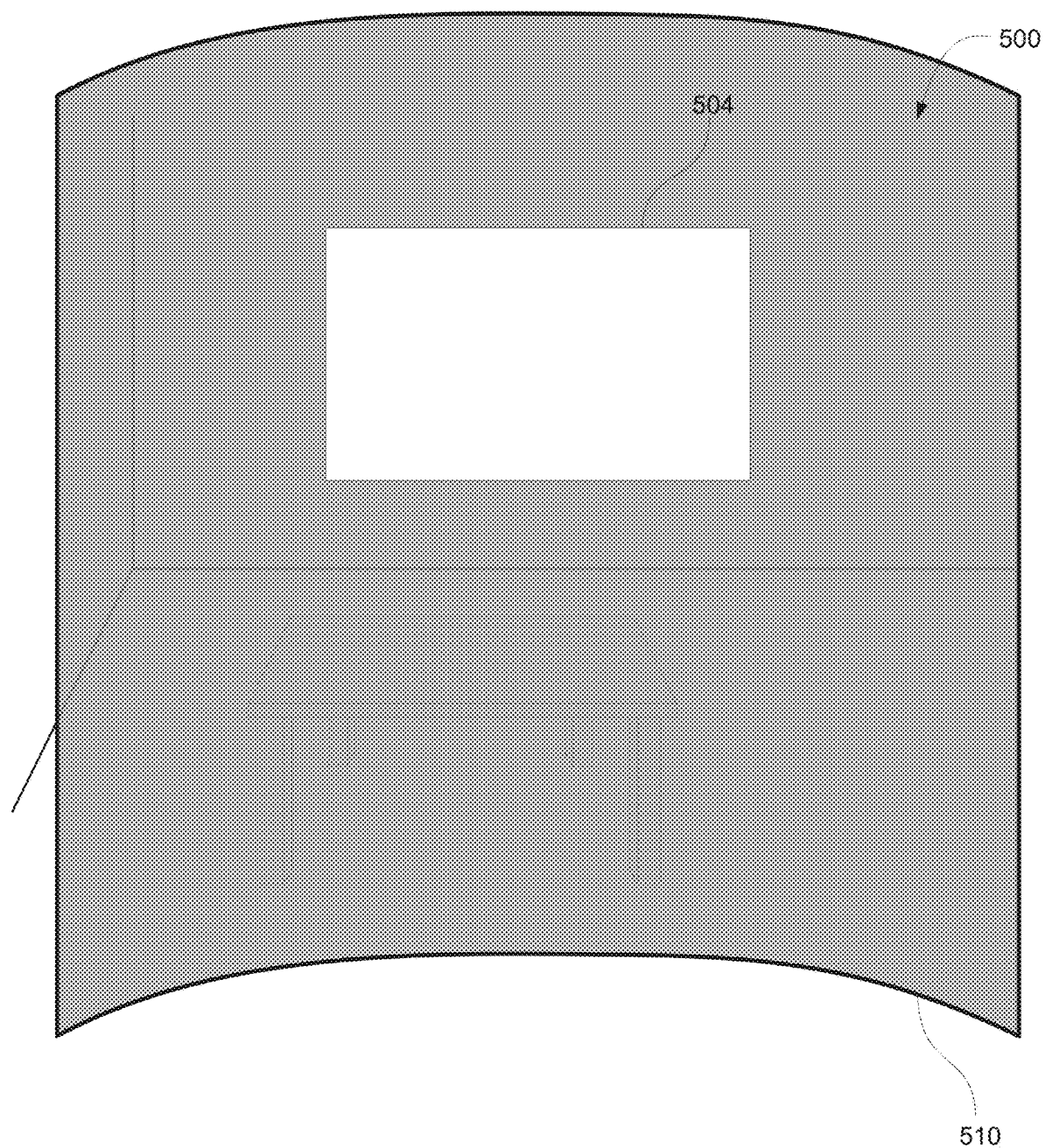

FIGS. 5A-5B illustrate a method of switching from one immersion level to another immersion level according to some embodiments of the disclosure. In FIG. 5A, the device is displaying three-dimensional environment 500 including table 508 and user interface 504 of an application. In some embodiments, user interface 504 is displayed with the first immersion level (e.g., no immersion). In FIG. 5A, a user input is received from a hand 509 of the user selecting selectable option 506-6 in user interface 504. For example, selectable option 506-6 can correspond to a representation of a media item such that selection of selectable option 506-6 causes playback of (e.g., display of) the media item associated with selectable option 506-6.

In some embodiments, in response to receiving the user input from hand 509 selecting selectable option 506-6, the application associated with user interface 504 begins playback of a respective media item and switches from the first immersion level to a second respective immersion level, as shown in FIG. 5B. In some embodiments, in response to the user input causing playback of a media item, user interface 504 enters into a content consumption mode and is automatically (e.g., without additional user input) moved to a location associated with media playback. For example, in FIG. 5B, the location associated with media playback is the back wall of three-dimensional environment 500 (e.g., such as to simulate a "theater" mode). In some embodiments, in response to the user input causing playback of a media item, user interface 504 automatically (e.g., without additional user input) enters into an elevated immersion level (e.g., such as the third immersive level described above with respect to FIG. 3C). Similarly to described in FIG. 3C, objects within immersion field 510 (e.g., within the effective area of immersion field 510) are dimmed, shaded, blurred, partially obscured, or otherwise visually de-emphasized as compared to user interface 504. As shown in FIG. 5B, user interface 504 (e.g., which is located within the effective display area of immersion field 510) is visually unmodified and as a result, is visually emphasized as compared to other objects within immersion field 510, such as the table 508 within immersion field 510. In some embodiments, immersion field 510 can cause certain objects to no longer be displayed. For example, the picture frame from FIG. 5A has ceased to be displayed (e.g., is fully obscured) by immersion field 510.

Thus, in FIG. 5B, user interface 504 is in a content consumption mode in which user interaction is limited to passive consumption of content (e.g., content viewing), whereas in FIG. 5A, user interface 504 is in an interactive state in which user interaction with the user interface is expected. Thus, while a user interface is being displayed in an interactive state, such as when the user interface includes selectable options or user interface elements (e.g., as in FIG. 5A), the user interface can be displayed at a low immersion level and when user interaction is expected to be limited and/or passive, such as in response to the user selecting a media item for playback, a user interface can be displayed at a high immersion level (or optionally a full screen immersion level).

In some embodiments, a three-dimensional environment can concurrently display two user interfaces of an application (e.g., two "windows") that are displayed at two different locations and/or two different distances from the user. In some embodiments, an application can have a portion that is interactive and a portion that is passive and the interactive portion can be organized onto a first user interface and the passive portion can be organized onto a second user interface. In some embodiments, a first user interface (with the interactive portions of the application) can be displayed closer to the user (e.g., such as user interface 304 in FIG. 3A) and the second user interface (with the passive portions of the application) can be displayed farther from the user (e.g., such as user interface 304 in FIG. 3B or FIG. 3C). For example, in a content browsing and playback application, the first user interface can include the user interface elements for browsing, finding, and/or selecting media items, and the second user interface can display previews, trailers, cover art, playback of media content, etc. In some embodiments, because the first user interface and second user interface of the media browsing and playback application are displayed at different locations and/or distances from the user, the two user interfaces can have different pitch values and/or sizes or even different immersion levels, as described above with respect to FIGS. 3A-3C.

Figure 6A:
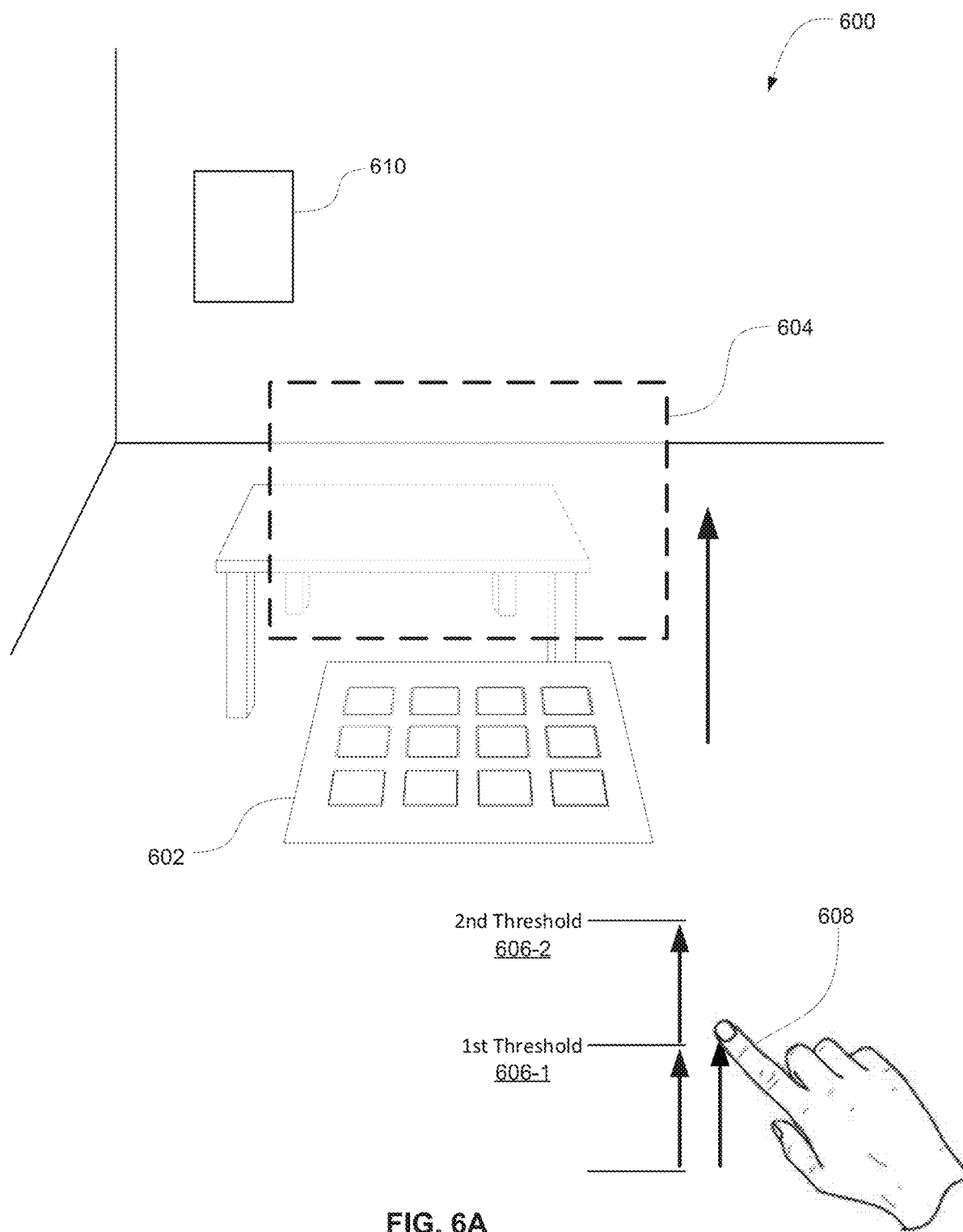
FIGS. 6A-6B illustrate a method of switching from one immersion level to another immersion level according to some embodiments of the disclosure.
Figure 6B:
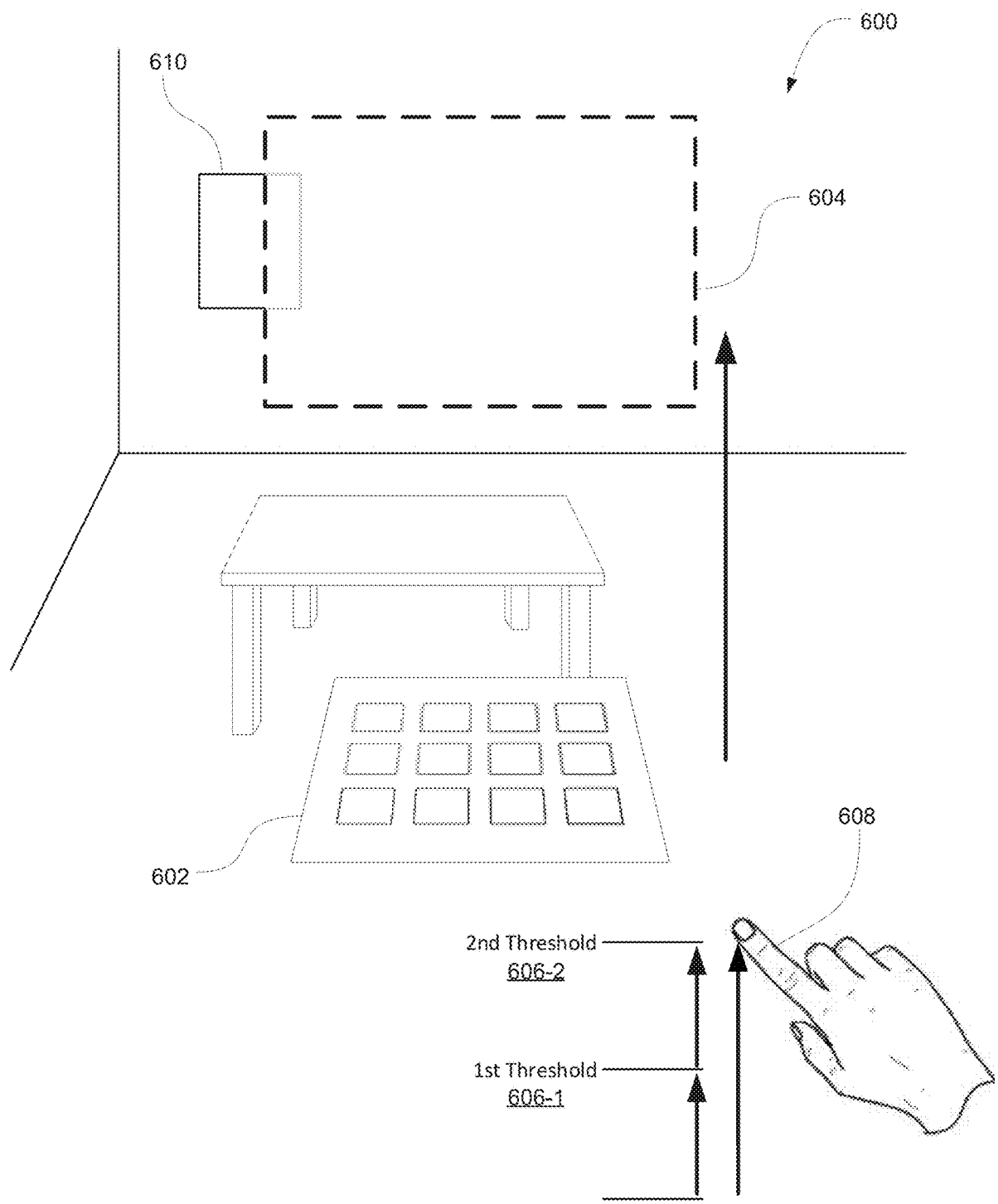

FIGS. 6A-6B illustrate a method of switching from one immersion level to another immersion level according to some embodiments of the disclosure. In FIG. 6A, the device is displaying three-dimensional environment 600 including user interface 602 of an application. In some embodiments, user interface 602 is displayed with the first immersion level (e.g., no immersion). In FIG. 6A, a user input is received from a hand 608 corresponding to a request to move user interface 602. As shown in FIG. 6A, the user input optionally includes a selection input (e.g., a pinch or a tap gesture) followed by a movement of hand 608 forward and/or up by up to and/or less than a first threshold amount 606-1. In some embodiments, the user input corresponds to a request to move user interface 602 upwards and/or farther away in three-dimensional environment 600. In some embodiments, the user input includes a pinching gesture and an upward (e.g., in the "y" dimension) or forward movement (e.g., in the "z" direction). In some embodiments, the pinching gesture is performed while hand 608 is at the location of user interface 602 such that it appears as if hand 608 is pinching a portion of user interface 602 and directly moving user interface 602 with hand 608. In some embodiments, while holding the pinching gesture, movement of hand 608 causes user interface 602 to move with hand 608 (e.g., as if hand 608 is pinching a part of user interface 602 and moving user interface 602 around three-dimensional environment 600).

In some embodiments, in response to the user input moving by up to and/or less than the first threshold amount 606-1, a target 604 is displayed at a location in three-dimensional environment 600 corresponding to the location that user interface 602 will be placed at in response to a termination of the user input (e.g., a release of the pinch gesture). In some embodiments, target 604 is an outline, dotted line, or any other indicator that indicates the location that user interface 602 will be placed in. In some embodiments, target 604 is transparent or translucent such that objects behind target 604 are fully or partially obscured. In some embodiments, target 604 has a size that is the same as or larger than the size and/or shape of user interface 602 if user interface 602 were placed at the position of target 604. In some embodiments, target 604 has a shape based on user interface 602. In some embodiments, target 604 has a pitch value that is based on the pitch value that user interface 602 would have if placed at the position of target 604.

In some embodiments, in response to detecting a termination of the user input, user interface 602 is placed at the location associated with target 604 (optionally with a different pitch value, as described above with respect to FIGS. 4A-4C). In some embodiments, certain locations and/or distances in three-dimensional environment 600 are associated with certain immersion levels. Thus, in response to moving a user interface to one of these respective positions, the user interface automatically changes from its previous immersion level to the immersion level associated with its new position. For example, in FIG. 6A, target 604 corresponds to a location in three-dimensional environment 600 that is associated with a second immersion level (e.g., such as in FIG. 4B). Thus, in response to moving user interface 602 to the location associated with target 604, user interface 602 automatically changes to a second immersion level (e.g., changing from the first immersion level to the second immersion level). In some embodiments, changing from the first to the second immersion level can cause elements of the user interface to change to adapt to the change in immersion level. For example, in response to switching from the first immersion level to the second immersion level, the user interface can change from a more interactive state to a less interactive state (e.g., to reflect the fact that the user interface is farther away, less interactive, and is in more of a passive consumption mode).

In FIG. 6B, a user input is received from a hand 608 of the user, including a selection input (e.g., a pinch or tap gesture) followed by a movement of hand 608 forward and/or up by more than the first threshold amount 606-1 and by up to or more than a second threshold amount 606-2 (e.g., where the second threshold amount 606-2 is more than the first threshold amount 606-1). In some embodiments, the user input corresponds to a request to move user interface 602 upwards and/or farther away in three-dimensional environment 600. In some embodiments, the user input includes a pinching gesture and an upward or forward movement. In some embodiments, the pinching gesture is performed while hand 608 is at the location of user interface 602 such that it appears as if hand 608 is pinching a portion of user interface 602 and directly moving user interface 602 with hand 608.

In some embodiments, in response to the user input moving by up to and/or less than the second threshold amount 606-2, a target 604 is displayed at a location in three-dimensional environment 600 corresponding to the location that user interface 602 will be placed at in response to a termination of the user input (e.g., on the back wall, such as in FIG. 4C). In some embodiments, in response to detecting a termination of the user input, user interface 602 is placed at the location associated with target 604 (optionally with a different pitch value, as described above with respect to FIGS. 4A-4C). In some embodiments, target 604 in FIG. 6B is associated with a high immersion level (e.g., such as the third immersion level described in FIG. 4C). Thus, in response to moving user interface 602 to the location associated with target 604, user interface 602 automatically receives the third immersion level (e.g., changing from the first immersion level to the third immersion level). In some embodiments, changing from the first to the third immersion level can cause the elements of the user interface to change to adapt to the change in immersion level. For example, in response to switching from the first immersion level to the third immersion level, user interface 602 can change from the more interactive state (e.g., such as in FIG. 5A) to a passive content consumption state (e.g., such as in FIG. 5B).

As described above, different applications can be displayed at different positions, different distances, and/or different immersion levels. In some embodiments, applications can have a preset number of supported immersion levels (e.g., discrete immersion levels or analog immersion levels) that correspond to different ranges of distances from the user and/or different locations in a three-dimensional environment. In some embodiments, applications can have multiple user interfaces concurrently displayed, with each being displayed at different positions, distances, and/or immersion levels. In some embodiments, in response to a user input and/or interaction with a user interface, the user interface can change automatically move locations and/or change immersion levels. In some embodiments, in response to a user input moving a user interface to a particular position and/or distance, the immersion level of the user interface can automatically change. In some embodiments, moving a user interface to a position and/or distance that is otherwise associated with a different immersion level does not necessarily automatically cause the immersion level to change and optionally causes a selectable option to be displayed (e.g., a button, a pop-up notification, etc.) that is selectable to change immersion levels to the associated level. In some embodiments, a user is able to select a control element such as a slider, a knob, a button, etc. (e.g., that is displayed in the three-dimensional environment or a control mechanism or provided as a physical input mechanism) to change the immersion level of a user interface, optionally without regard to whether the current position, distance, and/or mode (e.g., content consumption state vs. interactive state) of the user interface is associated with a particular immersion level.

It is understood that while the description above describes user interfaces having immersion levels, the system itself (e.g., the three-dimensional environment) can have changing immersion levels and changing the immersion level of a respective user interface includes changing the immersion level of the system (e.g., changing the visual appearance of the objects in the environment).

Figure 7:
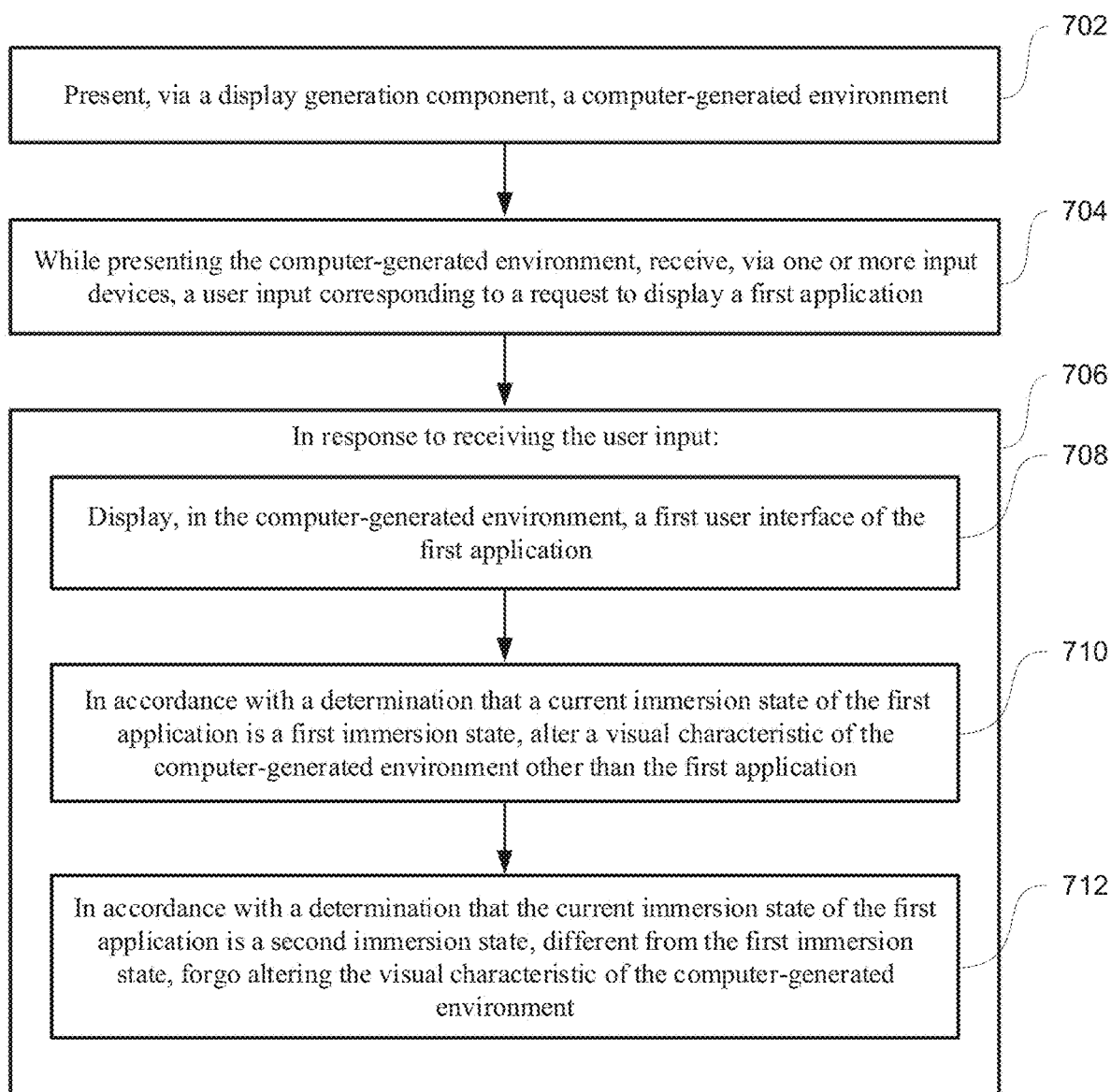
FIG. 7 is a flow diagram illustrating a method of displaying a user interface of an application in a three-dimensional environment according to some embodiments of the disclosure.

FIG. 7 is a flow diagram illustrating a method 700 of displaying a user interface of an application in a three-dimensional environment according to some embodiments of the disclosure. The method 700 is optionally performed at an electronic device such as device 100, and device 200 when displaying selectable options on a surface described above with reference to FIGS. 3A-3C, 4A-4B, 5A-5B, and 6A-6B. Some operations in method 700 are, optionally combined and/or order of some operations is, optionally, changed. As described below, the method 700 provides methods of displaying a user interface of an application in a three-dimensional environment in accordance with embodiments of the disclosure (e.g., as discussed above with respect to FIGS. 3A-6B).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (optionally a touch screen display) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) presents (702), via the display generation component, a computer-generated environment, such as three-dimensional environment 300 in FIGS. 3A-3C. In some embodiments, while presenting the computer-generated environment, the electronic device receives (704), via the one or more input devices, a user input corresponding to a request to display a first application, such as application corresponding to user interface 304 in FIG. 3A-3C. In some embodiments, in response to the user input (706), the electronic device displays (708), in the computer-generated environment, a first user interface of the first application, such as the application corresponding to user interface 304 in FIG. 3A. In some embodiments, in accordance with a determination that a current immersion state of the first application is a first immersion state, the electronic device alters (710) a visual characteristic of the computer-generated environment other than the first application, such as in FIGS. 3B and 3C. In some embodiments, in accordance with a determination that the current immersion state of the first application is a second immersion state, different from the first immersion state, the electronic device forgoes (712) altering the visual characteristic of the computer-generated environment, such as in FIG. 3A.

In some embodiments, altering the visual characteristic of the computer-generated environment includes changing a brightness of at least a portion of the computer-generated environment, such as in FIGS. 3B and 3C. In some embodiments, before receiving the user input, the computer-generated environment includes a user interface of a second application, different from the first application, and altering the visual characteristic of the computer-generated environment includes ceasing display of the user interface of the second application in the computer-generated environment. For example, when displaying the first application with the first immersion state, the user interface of the second application is faded, darkened, minimized, or fully ceased to be displayed (optionally only if the second application is within the immersion field of the first application). In some embodiments, upon the first application exiting the first immersion state and/or entering the second immersion state, the user interface of the second application is restored (e.g., re-displayed in the environment).

In some embodiments, while the current immersion state of the first application is the first immersion state, the first user interface of the first application has a first pitch value, and while the current immersion state of the first application is the second immersion state, the first user interface of the first application has a second pitch value, different from the first pitch value, such as the user interface having a first pitch value in FIG. 3B and a second pitch value in FIG. 3A.

In some embodiments, in accordance with a determination that the first application is in a content consumption mode, the electronic device configures the first application to have the first immersion state, such as in FIG. 5B. In some embodiments, in accordance with a determination that the first application is in an interactive mode, different from the content consumption mode, the electronic device configures the first application to have the second immersion state, such as in FIG. 3A.

In some embodiments, the computer-generated environment includes the first user interface of the first application and a second user interface, visually separate from the first user interface, of the first application. For example, an application can include two visually separate user interfaces (e.g., two windows). In some embodiments, the first user interface of the first application has a first pitch value and the second user interface of the first application has a second pitch value, different from the first pitch value. For example, the two user interfaces of the first application can be placed at different locations in the user interface or at different levels in the three-dimensional environment (e.g., below eye level, at eye level, above eye level, etc.), thus causing the user interfaces to have different pitch values.

In some embodiments, the first user interface of the first application includes a plurality of user interface elements, including a first selectable option, such as selectable options 306-1 to 306-4 in FIG. 3A. In some embodiments, while displaying the first user interface, the electronic device determines that a gaze of a user of the device is directed to the first selectable option, such as gaze 412 being directed to selectable option 406-1 in FIG. 4B. In some embodiments, in accordance with the determination that the gaze of the user is directed to the first selectable option, the electronic device visually emphasizes the first selectable option and visually de-emphasizing others of the plurality of user interface elements, such as the highlighting and/or enlarging of selectable option 406-1 with respect to the other selectable options, which are darkened in FIG. 4B.

In some embodiments, while the current immersion state of the first application is a first respective immersion state, the electronic device receives a second user input, such as an input moving the position of the first application, such as in FIGS. 6A and 6B. In some embodiments, in response to receiving the second user input, the electronic device configures the first application to have a second respective immersion state, different from the first respective immersion state. For example, if the user moved an application to a location that is not associated with an elevated immersion level, the user interface can be configured to have no immersion. In some embodiments, if the user interacted with the application such as to exit a passive content consumption mode and enter into an interactive mode, the device can reduce the immersion level to have no immersion. In another example, if the application is at a level with no immersion and the user input is a request to move the application associated with an elevated immersion level, then the user interface can be configured to have the elevated immersion level (optionally only if the user interface supports the elevated immersion level). In some embodiments, if the user interacted with the application such as to exit an interactive mode and enter into a passive content consumption mode, the device can increase the immersion level.

In some embodiments, the second user input corresponds to a request to display content, such as in FIG. 5A. For example, if the user selected a selectable option to cause playback of media content. In some embodiments, playback of media content causes the user interface to enter into a content consumption mode (e.g., theater mode), which optionally causes the user interface to increase the immersion to an elevated immersion level. In some embodiments, the second user input corresponds to a request to move the first user interface to a location in the computer-generated environment associated with the second respective immersion state. For example, if the user moved the user interface from a first location (e.g., height, depth, etc.) associated with one immersion level to another location (e.g., height, depth, etc.) associated with another immersion level, then the user interface can be configured to have the respective immersion level (optionally only if the user interface supports the respective immersion level, or optionally the highest immersion level supported by the user interface that is equal to or less than the respective immersion level).

In some embodiments, altering the visual characteristic of the computer-generated environment other than the first application includes displaying one or more immersion fields in the computer-generated environment, and forgoing altering the visual characteristic of the computer-generated environment includes forgoing displaying the one or more immersion fields in the computer-generated environment.

In some embodiments, the first user interface of the first application is located within an effective boundary of the one or more immersion fields. For example, immersion field 310 in FIG. 3B and FIG. 3C is displayed such that user interface 304 falls within the effective area of immersion field 310. In some embodiments, the immersion field is displayed in front of the three-dimensional environment (e.g., displayed in front of every object within the three-dimensional environment) and objects that fall within the effective area of immersion field (e.g., any object that appears within the border of immersion field from the perspective of the user and/or device) are affected by the immersion field (e.g., other than the user interface of the application that is not visually altered). As shown, user interface 304 is not necessarily displayed in the center of the effective boundary of immersion field 310 and can be displayed at any location within the effective boundary of immersion field 310 (e.g., for example, if user interface 304 is displayed at or near an edge of three-dimensional environment 300, user interface 304 can be displayed closer to one edge of immersion field 310, such as shown in FIG. 3C).

In some embodiments, the effective boundary of the one or more immersion fields encompasses an area greater than an area of the first user interface of the first application. For example, the effective boundary and/or effective area of the immersion fields are larger than the size of the first user interface of the first application such that the immersion fields appear larger than the first user interface (e.g., 50% larger, 100% larger, 300% larger, etc.). In some embodiments, the size of the immersion field depends on the immersive state. For example, at a lower immersive state (e.g., less immersion), the size of the immersion field is smaller than if the application were at a higher immersive state (e.g., more immersion).

In some embodiments, altering the visual characteristic of the computer-generated environment other than the first application includes visually de-emphasizing one or more objects in the computer-generated environment, other than the first user interface of the first application, that are located within the effective boundary of the one or more immersion fields. For example, displaying immersion field 310 around user interface 304 such as in FIG. 3B and FIG. 3C. As shown, the portions of table 308 that fall within the effective boundary of immersion field 310 in FIG. 3B (e.g., the entirety of table 308 except for a portion of the front-right leg) are visually de-emphasized (e.g., shaded, greyed, darkened, etc.), as compared to user interface 304, which is optionally not visually altered. In FIG. 3B, the portion of picture frame 302 that falls within the effective boundary of immersion field 310 (e.g., bottom-right corner) is also visually de-emphasized, as compared to the portions of picture frame 302 that do not fall within the effective boundary of immersion field 310, which are not visually altered.

In some embodiments, in accordance with the determination that the current immersion state of the first application is a first immersion state, the effective boundary of the one or more immersion fields encompasses a first area. For example, in FIG. 3B, when user interface 304 is at the second immersive level, immersion field 310 has a first size. In some embodiments, in accordance with the determination that the current immersion state of the first application is a third immersion state, different from the first and second immersion states, the electronic device displays the one or more immersion fields in the computer-generated environment, wherein the effective boundary of the one or more immersion fields encompasses a second area, different than the first area. For example, in FIG. 3C, when user interface 304 is at the third immersive level, immersion field 310 is displayed around user interface 304 and has a second size, larger than the size of immersion field 310 in FIG. 3B.

In some embodiments, while the effective boundary of the one or more immersion fields encompasses the first area, a first object located within the effective boundary of the one or more immersion fields encompassing the first area is visually de-emphasized, and a second object located outside of the effective boundary of the one or more immersion fields encompassing the first area is not visually de-emphasized. For example, when the immersion field has a first size (e.g., due to being in the first immersion state), the first object, which is located within the effective boundary of the immersion field when it has a first size, is visually de-emphasized (e.g., is affected by the immersion field), whereas the second object, which is not located within the effective boundary of the immersion field when it has the first size (e.g., but does fall within the effective boundary of the immersion field when it has the second size), is not visually de-emphasized.

In some embodiments, while the effective boundary of the one or more immersion fields encompasses the second area, the first object located within the effective boundary of the one or more immersion fields encompassing the second area is visually de-emphasized, and the second object located within the effective boundary of the one or more immersion fields encompassing the second area is visually de-emphasized. For example, when the immersion field has a second size (e.g., due to being in the third immersion state), the first object, which is still located within the effective boundary of the immersion field when it has the second size, is visually de-emphasized, and the second object, which is now also located within the effective boundary of the immersion field when it has the second size, is also visually de-emphasized.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
presenting, via the display, a computer-generated environment;
while presenting the computer-generated environment, receiving, via the one or more input devices, a user input corresponding to a request to display a first application; and
in response to receiving the user input:
displaying, in the computer-generated environment, a first user interface of the first application;
in accordance with a determination that a current immersion state of the first application is a first immersion state, wherein an immersion state is indicative of an amount of visual emphasis of an object relative to other objects within the computer-generated environment, altering a visual characteristic of the computer-generated environment other than the first application; and
in accordance with a determination that the current immersion state of the first application is a second immersion state, different from the first immersion state, forgoing altering the visual characteristic of the computer-generated environment.

2. The method of claim 1, wherein altering the visual characteristic of the computer-generated environment includes changing a brightness of at least a portion of the computer-generated environment.

3. The method of claim 1, wherein before receiving the user input, the computer-generated environment includes a user interface of a second application, different from the first application, and altering the visual characteristic of the computer-generated environment includes ceasing display of the user interface of the second application in the computer-generated environment.

4. The method of claim 1, wherein:
while the current immersion state of the first application is the first immersion state, the first user interface of the first application is displayed within the computer-generated environment with an orientation having a first pitch value, and while the current immersion state of the first application is the second immersion state, the first user interface of the first application is displayed within the computer-generated environment with an orientation having a second pitch value, different from the first pitch value.

5. The method of claim 1, further comprising:
in accordance with a determination that the first application is in a content consumption mode, configuring the first application to have the first immersion state; and
in accordance with a determination that the first application is in an interactive mode, different from the content consumption mode, configuring the first application to have the second immersion state.

6. The method of claim 1, wherein:
the computer-generated environment includes the first user interface of the first application and a second user interface, visually separate from the first user interface, of the first application, and
the first user interface of the first application is displayed within the computer-generated environment with an orientation having a first pitch value and the second user interface of the first application is displayed within the computer-generated environment with an orientation having a second pitch value, different from the first pitch value.

7. The method of claim 1, wherein the first user interface of the first application includes a plurality of user interface elements, including a first selectable option, the method further comprising:
while displaying the first user interface, determining that a gaze of a user of the electronic device is directed to the first selectable option; and
in accordance with the determination that the gaze of the user is directed to the first selectable option, visually emphasizing the first selectable option and visually de-emphasizing others of the plurality of user interface elements.

8. The method of claim 1, further comprising:
while the current immersion state of the first application is a first respective immersion state, receiving a second user input; and
in response to receiving the second user input, configuring the first application to have a second respective immersion state, different from the first respective immersion state.

9. An electronic device, comprising:
one or more processors;
memory; and
one or more programs, wherein the one or more programs are stored in the memory and configured to be executed by the one or more processors, the one or more programs including instructions for:
presenting, via a display, a computer-generated environment;
while presenting the computer-generated environment, receiving, via one or more input devices, a user input corresponding to a request to display a first application; and
in response to receiving the user input:
displaying, in the computer-generated environment, a first user interface of the first application;
in accordance with a determination that a current immersion state of the first application is a first immersion state, wherein an immersion state is indicative of an amount of visual emphasis of an object relative to other objects within the computer-generated environment, altering a visual characteristic of the computer-generated environment other than the first application; and in accordance with a determination that the current immersion state of the first application is a second immersion state, different from the first immersion state, forgoing altering the visual characteristic of the computer-generated environment.

10. The electronic device of claim 9, wherein altering the visual characteristic of the computer-generated environment includes changing a brightness of at least a portion of the computer-generated environment.

11. The electronic device of claim 9, wherein before receiving the user input, the computer-generated environment includes a user interface of a second application, different from the first application, and altering the visual characteristic of the computer-generated environment includes ceasing display of the user interface of the second application in the computer-generated environment.

12. The electronic device of claim 9, wherein:

while the current immersion state of the first application is the first immersion state, the first user interface of the first application is displayed within the computer-generated environment with an orientation having a first pitch value, and while the current immersion state of the first application is the second immersion state, the first user interface of the first application is displayed within the computer-generated environment with an orientation having a second pitch value, different from the first pitch value.

13. The electronic device of claim 9, the one or more programs including further instructions for:

in accordance with a determination that the first application is in a content consumption mode, configuring the first application to have the first immersion state; and in accordance with a determination that the first application is in an interactive mode, different from the content consumption mode, configuring the first application to have the second immersion state.

14. The electronic device of claim 9, wherein:

the computer-generated environment includes the first user interface of the first application and a second user interface, visually separate from the first user interface, of the first application, and the first user interface of the first application is displayed within the computer-generated environment with an orientation having a first pitch value and the second user interface of the first application is displayed within the computer-generated environment with an orientation having a second pitch value, different from the first pitch value.

15. The electronic device of claim 9, wherein the first user interface of the first application includes a plurality of user interface elements, including a first selectable option, the one or more programs including further instructions for:

while displaying the first user interface, determining that a gaze of a user of the electronic device is directed to the first selectable option; and in accordance with the determination that the gaze of the user is directed to the first selectable option, visually emphasizing the first selectable option and visually de-emphasizing others of the plurality of user interface elements.

16. The electronic device of claim 9, the one or more programs including further instructions for:

while the current immersion state of the first application is a first respective immersion state, receiving a second user input; and in response to receiving the second user input, configuring the first application to have a second respective immersion state, different from the first respective immersion state.

17. A non-transitory computer readable storage medium storing one or more programs, the one or more programs comprising instructions, which when executed by one or more processors of an electronic device, cause the electronic device to:

present, via a display, a computer-generated environment;

while presenting the computer-generated environment, receive, via one or more input devices, a user input corresponding to a request to display a first application; and in response to receiving the user input:

display, in the computer-generated environment, a first user interface of the first application;

in accordance with a determination that a current immersion state of the first application is a first immersion state, wherein an immersion state is indicative of an amount of visual emphasis of an object relative to other objects within the computer-generated environment, alter a visual characteristic of the computer-generated environment other than the first application; and in accordance with a determination that the current immersion state of the first application is a second immersion state, different from the first immersion state, forgo altering the visual characteristic of the computer-generated environment.

18. The non-transitory computer readable storage medium of claim 17, wherein altering the visual characteristic of the computer-generated environment includes changing a brightness of at least a portion of the computer-generated environment.

19. The non-transitory computer readable storage medium of claim 17, wherein before receiving the user input, the computer-generated environment includes a user interface of a second application, different from the first application, and altering the visual characteristic of the computer-generated environment includes ceasing display of the user interface of the second application in the computer-generated environment.

20. The non-transitory computer readable storage medium of claim 17, wherein:

while the current immersion state of the first application is the first immersion state, the first user interface of the first application is displayed within the computer-generated environment with an orientation having a first pitch value, and while the current immersion state of the first application is the second immersion state, the first user interface of the first application is displayed within the computer-generated environment with an orientation having a second pitch value, different from the first pitch value.

21. The non-transitory computer readable storage medium of claim 17, wherein the instructions, when executed by the one or more processors, further cause the electronic device to:

in accordance with a determination that the first application is in a content consumption mode, configure the first application to have the first immersion state; and in accordance with a determination that the first application is in an interactive mode, different from the content consumption mode, configure the first application to have the second immersion state.

22. The non-transitory computer readable storage medium of claim 17, wherein:
   the computer-generated environment includes the first user interface of the first application and a second user interface, visually separate from the first user interface, of the first application, and
   the first user interface of the first application is displayed within the computer-generated environment with an orientation having a first pitch value and the second user interface of the first application is displayed within the computer-generated environment with an orientation having a second pitch value, different from the first pitch value.

23. The non-transitory computer readable storage medium of claim 17, wherein the first user interface of the first application includes a plurality of user interface elements, including a first selectable option, and wherein the instructions, when executed by the one or more processors, further cause the electronic device to:
   while displaying the first user interface, determining that a gaze of a user of the electronic device is directed to the first selectable option; and
   in accordance with the determination that the gaze of the user is directed to the first selectable option, visually emphasizing the first selectable option and visually de-emphasizing others of the plurality of user interface elements.

24. The non-transitory computer readable storage medium of claim 17, wherein the instructions, when executed by the one or more processors, further cause the electronic device to:
   while the current immersion state of the first application is a first respective immersion state, receiving a second user input; and
   in response to receiving the second user input, configuring the first application to have a second respective immersion state, different from the first respective immersion state.

* * * * *